US008120476B2

United States Patent
Chen et al.

(10) Patent No.: US 8,120,476 B2
(45) Date of Patent: Feb. 21, 2012

(54) DIGITAL CAMERA REAR-VIEW SYSTEM

(75) Inventors: Cheng Chen, Fort Wayne, IN (US);
Fong-Ioon Pan, Fort Wayne, IN (US);
Gary Wagner, Roanoke, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 373 days.

(21) Appl. No.: 12/507,359

(22) Filed: Jul. 22, 2009

(65) Prior Publication Data
US 2011/0018699 A1 Jan. 27, 2011

(51) Int. Cl.
*B60Q 1/00* (2006.01)
(52) U.S. Cl. ............... 340/435; 340/425.5; 340/436; 340/438; 340/904
(58) Field of Classification Search ............ 340/425.5, 340/436, 438, 904; 348/148
See application file for complete search history.

(56) References Cited

U.S. PATENT DOCUMENTS

| 6,690,268 B2 * | 2/2004 | Schofield et al. ............ 340/438 |
| 7,202,776 B2 | 4/2007 | Breed |
| 7,330,124 B2 | 2/2008 | Ota |
| 2008/0167819 A1 | 7/2008 | Breed |

FOREIGN PATENT DOCUMENTS
WO 2008/048370 A2 4/2008
* cited by examiner

*Primary Examiner* — Daryl Pope
(74) *Attorney, Agent, or Firm* — Jeffrey P. Calfa; Mark C. Bach

(57) ABSTRACT

A rear-view system for a vehicle has a camera disposed on the vehicle. An electronic control unit receives and processes the image information from the camera. A display displays the processed image information from the electronic control unit. An alarm is operated by the electronic control unit. The electronic control unit is used to detect an object from the processed image information. If the distance between the vehicle and the object is less than a predetermined distance, the electronic control unit will activate the alarm.

12 Claims, 2 Drawing Sheets

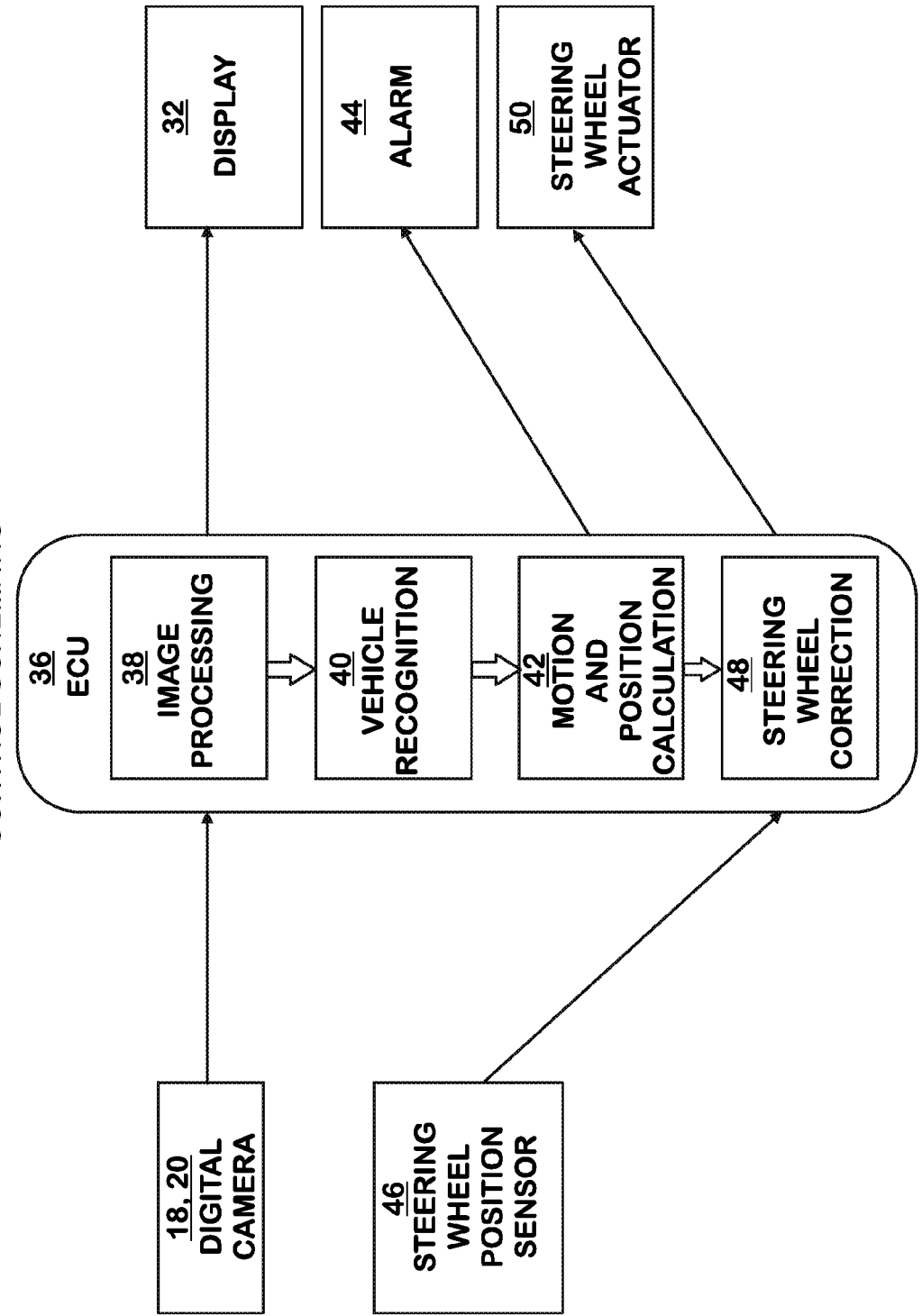

DIGITAL CAMERA REAR-VIEW SYSTEM

BACKGROUND

Embodiments described herein relate generally to both fuel economy and visibility in vehicles. More specifically, embodiments described herein relate to providing a vehicle with a more aerodynamic shape for increased fuel economy as well as providing the driver with increased visibility of the surroundings.

Fuel economy in vehicles is directly related to various aerodynamic properties of the vehicle body that result in the vehicle's aerodynamic drag force. Factors that contribute to the drag force on a vehicle include the frontal area of the vehicle and the profile of the vehicle, among other factors. Generally, the larger the vehicle, such as a truck or a bus, the more frontal area there may be, and therefore the larger amount of drag force there may be on the vehicle. The larger the drag force, the lower the fuel economy of the vehicle.

By reducing the frontal area of the vehicle, the drag force may in turn be reduced and the fuel economy may be increased. One portion of the frontal area that greatly contributes to air drag are the rear-view mirrors, which are located at or near the driver's side door and the passenger's side door and that protrude beyond the sides of the vehicle, also called side-view mirrors. By reducing the size of the rear-view mirror, the drag force on the vehicle may be reduced. However, the size of the rear view mirrors may not be reduced to the extent that the driver's visibility is impaired.

Conventional optical rear-view mirrors have a "blind spot", a location where the driver cannot see objects located to the side and rearward of the front end of the vehicle. Vehicles in the adjacent lanes of the road from the primary vehicle may fall into these blind spots, and a driver may be unable to see these other vehicles using only the primary vehicle's rear-view mirrors.

SUMMARY

A rear-view system for a vehicle has a camera mounted on the vehicle. An electronic control unit receives and processes image information from the camera. A display disposed on the vehicle displays image information processed by the electronic control unit. An alarm operatively connected with the vehicle is operated by the electronic control unit. The electronic control unit is detects an object from the processed image information. If distance between the vehicle and the object is less than a predetermined distance, the electronic control unit activates the alarm.

BRIEF DESCRIPTION OF THE DRAWINGS

FIG. 2 is a schematic of a control system for the camera rear-view system.

DETAILED DESCRIPTION

Figure 1:
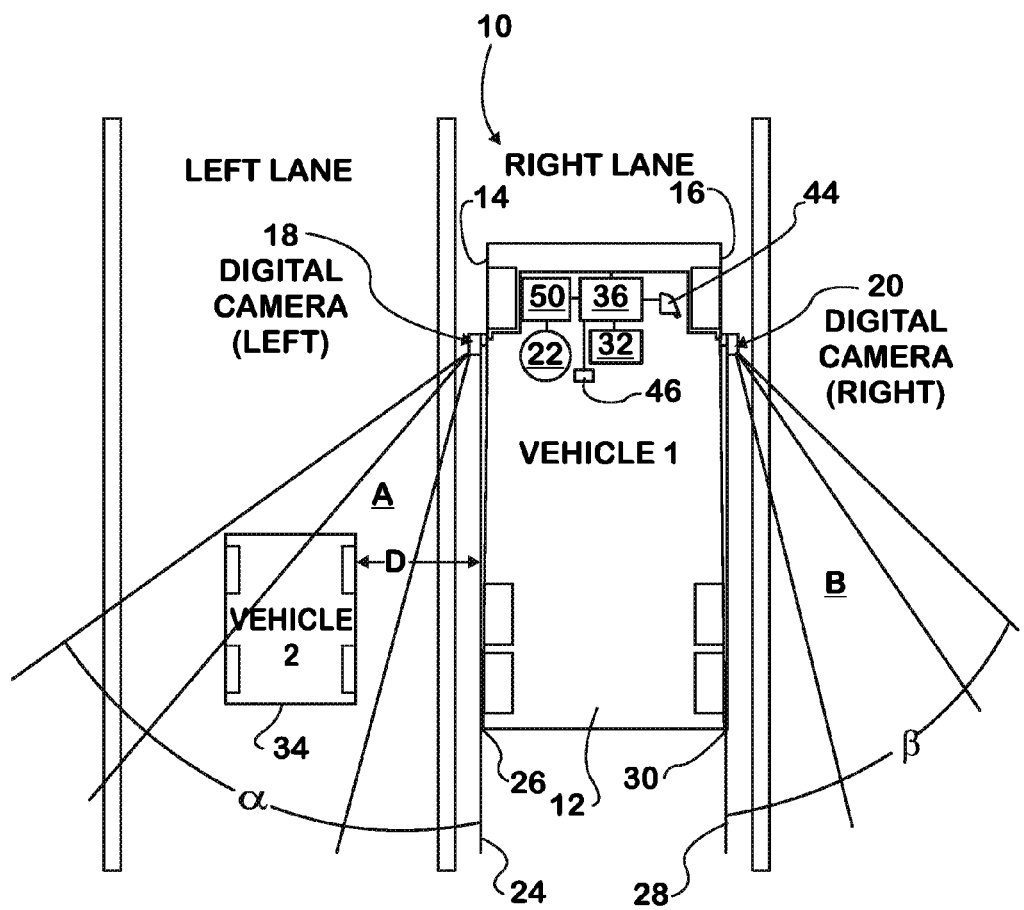
FIG. 1 is a schematic of a vehicle having a camera rear-view system for detecting a secondary vehicle.

Referring now to FIG. 1, a camera rear-view system is depicted generally at 10, and is disposed on a vehicle 12 for detecting objects in the environment external to the vehicle. The camera rear-view system 10 provides expanded visual information compared to a conventional mirror, and alerts a driver of the vehicle of information relevant to objects that exist within a viewing angle $\alpha$, for example another vehicle, an object in the road, or a guardrail. The camera rear-view system 10 can be used with cars, trucks, buses and any other vehicles.

The vehicle 12 is a right-hand-drive vehicle that is provided with a steering wheel 22 located on the right-hand side, however in one embodiment, the camera rear-view system can be implemented on a left-hand side vehicle. The vehicle 12 has a first side 14, or driver's side, and a second side 16, or passenger side. A first camera 18 is positioned on the first side 14 generally at the location of a conventional rear-view mirror, sometimes called a side-view mirror. A second camera 20 is positioned on the second side 16 of the vehicle 12, also generally at the location of a conventional passenger's side rear-view mirror. In one embodiment, the cameras 18, are automatically turned on when the electrical system of the vehicle 12 is turned on.

The cameras 18 and 20 are generally smaller and have a smaller frontal surface area compared to conventional optical mirrors. The vehicle 12 having the cameras 18 and 20 has a smaller frontal surface area than the same vehicle 12 having conventional mirrors, and the vehicle 12 having the cameras 18 and 20 has a smaller drag force.

The first camera 18 is mounted on the first side 14 and is aimed in the vehicle's rearward direction to have the viewing angle $\alpha$, and the second camera 20 is similarly mounted on the second side 16 and is aimed in the vehicle's rearward direction to have a viewing angle $\beta$. The first camera 18 has a first inward sight-line 24 that generally extends from the first camera to a first rear corner 26 of the vehicle 12 on the first side 14, and the second camera 20 has a second inward sight-line 28 that generally extends from the second camera to a second rear corner 30 of the vehicle on the second side 16. The cameras 18, 20 are digital cameras, however the cameras 18, 20 may use other imaging technologies.

The camera 18, 20 is mounted on the first side 14 or the second side 16 or both sides for generating image information of a view angle area A, B that includes the visual blind spot. The viewing angle $\alpha$ and the viewing angle $\beta$ may be determined by the particular camera, however in general, the wider the viewing angle the better. In one embodiment, the viewing angles $\alpha$ and $\beta$ are at least as large as the viewing angle provided by a conventional rear-view mirror. In another embodiment, the viewing angles $\alpha$ and $\beta$ are larger than the conventional rear-view mirror. Specifically, conventional rear-view mirrors have a "blind spot" where the driver cannot see objects located to the side and rearward of the front end of the vehicle 12. As shown in FIG. 1, the viewing angles $\alpha$ and $\beta$ define view angle area A and view angle area B, respectively, that includes any "blind spot" area of a conventional mirror.

The cameras 18, 20 are provided with infrared imaging capabilities for nighttime or other low-light driving. With infrared imaging, the camera rear-view system 10 can provide better visibility than a conventional mirror when there is little to no visible light. In one embodiment, the camera visibility mode switches to an infrared/night vision mode automatically.

Referring now to FIG. 1 and FIG. 2, the images from the cameras 18, 20 are displayed in a vehicle cabin with a display 32. When another vehicle or other object 34 that is in the environment external to the vehicle 12 (herein referred to as "object 34") is stationary or dynamic within the viewing angle areas A, B of the camera 18, 20, the object is displayed at the display 32 to inform the driver of the existence of the object.

An electronic or engine control unit 36 detects the presence of the object 34 by receiving and processing at a processor 38 image information from the camera 18, 20. After processing, an image from the image information is displayed in the vehicle cabin at the display 32. In one embodiment, the electronic control unit 36 processes image pattern recognition algorithms that detect whether the object 34 within the viewing angle area A, B is a secondary vehicle. The image pattern recognition algorithms are processed at a vehicle recognition analyzer 40. In another embodiment, viewing area A, B can be limited or the processor 38 can be programmed to process image information within a certain radial distance from the camera, for example to limit the field of image information to about one-lane of traffic to each side of the vehicle 12, and about one to two vehicle lengths to the rear of the cameras 18, 20.

If the electronic control unit 36 determines that the object 34 is in the viewing angle area A, B of the camera, the electronic control unit uses the vehicle's 12 speed, location and trajectory to calculate the speed, location and trajectory of the object 34 at an ECU calculator 42 operatively connected with the electronic control unit 36. When the electronic control unit 36 determines that a distance, such as the lateral distance D (taken perpendicular to the axis of the vehicle), between the vehicle 12 and the object is within a predetermined distance, the electronic control unit 36 operates and activates an alarm 44 operatively connected with the electronic control unit 36. The alarm 44 can be an audible alarm or can be an indicator on the display 32, or any other method or apparatus for warning the driver that there is less distance than the predetermined lateral distance D between the vehicle 12 and the object 34. When the distance, such as the lateral distance D, between the vehicle 12 and the object 34 exceeds the predetermined distance, the alarm 44 is de-activated by the engine control unit 36.

The electronic control unit 36 calculates the speed, location and trajectory of the vehicle 12. The speed is calculated from a wheel speed sensor. A steering wheel position sensor 46 senses the amount of rotation of the steering wheel 22 with respect to a neutral steering wheel position that corresponds to a straight vehicle trajectory, and in turn can input the steering wheel position to the electronic control unit 36 to calculate the trajectory of the vehicle 12.

Using the speed, location and trajectory information of the vehicle 12 and the speed, location and trajectory of the object 34 calculated at the ECU calculator 42, the electronic control unit 36 can determine whether a collision between the vehicle 12 and the object 34 is likely, as determined by pre-determined parameters. In one embodiment, parameters that are imposed on the electronic control unit 36 to determine whether a potential collision is likely may include a range of speeds of the vehicles/object, trajectories of the vehicles/object, relative position of the vehicles/object, and lateral distance between the vehicles/object, among others, to determine an estimated time before a potential collision may occur.

If the time estimated before a potential collision is at or below a pre-determined value, for example 4-seconds, the electronic control unit 36 would determine the potential collision to be likely. If the electronic control unit 36 determines that a potential collision is likely, either through using the above parameters or by comparing the distance between the vehicle 12 and the object or secondary vehicle 34, an alarm 44 is activated by the engine control unit 36 to alert the driver.

Additionally, in one embodiment, a steering wheel correction can be instructed by the electronic control unit 36 to the steering wheel corrector 48. A steering wheel actuator 50 can prevent the further torquing of the steering wheel 22 in a direction determined to exacerbate the likelihood of collision, or can apply some pressure counter to the torquing of the steering wheel in a direction that would exacerbate the likelihood of the collision with the secondary vehicle 34. At all times during operation, any pressure applied by the steering wheel actuator 50 could be manually overcome by the driver.

As the ECU calculator 42 continually calculates the speed, location and trajectory of the object or secondary vehicle 34, and the electronic control unit 36 determines that no collision is likely, the steering wheel corrector 48 would de-activate the alarm 44. The engine control unit 36 continuously processes image information and activates and de-activates the alarm 44 under the established parameters.

What is claimed is:

1. A rear-view system for a vehicle having a first side and a second side, the rear-view system comprising:
   a first camera disposed at the first side vehicle, the first camera generating image information;
   an electronic control unit receiving and processing the image information from the first camera;
   a display displaying processed image information from the electronic control unit;
   an alarm operatively connected with and activatable by the electronic control unit;
   wherein the electronic control unit activates the alarm when the electronic control unit detects an object from the processed image information, and when distance between the vehicle and the object is less than a predetermined distance;
   a steering wheel disposed on the vehicle; and
   a steering wheel actuator operatively connected with the steering wheel, wherein under pre-determined parameters, the steering wheel actuator applies a force to the steering wheel.

2. The rear-view system of claim 1 further comprising:
   a second camera disposed at the second side of the vehicle.

3. The rear-view system of claim 1 wherein the first camera is a digital camera imaging both visible light and infrared light.

4. The rear-view system of claim 1 further comprising:
   a calculator operatively connected with the electronic control unit, the calculator calculating speed, location and trajectory of the vehicle.

5. The rear-view system of claim 4 wherein the electronic control unit compares speed, location and trajectory of the vehicle with speed, location and trajectory of the object.

6. The rear-view system of claim 1 wherein the steering wheel actuator applies a torque to the steering wheel directing the vehicle away from the object.

7. The rear-view system of claim 1 further comprising:
   a steering wheel position sensor operatively connected with the steering wheel, wherein the steering wheel position sensor senses rotation of the steering wheel with respect to a neutral position corresponding to a generally straight trajectory of the vehicle.

8. The rear-view system of claim 1 further comprising:
   a steering wheel disposed on the vehicle; and
   a steering wheel actuator operatively connected with the steering wheel, wherein when lateral distance between the vehicle and the object is less than a predetermined distance, the steering wheel actuator applies a force to the steering wheel.

9. The rear-view system of claim 1 wherein the alarm is at least one of an audible alarm and a visual alarm.

10. A vehicle having rear-view system to detect an object in a visual blind spot of the vehicle, the vehicle comprising:
    a steering wheel;
    a first side of the vehicle;

a camera mounted on the first side for generating image information of a view angle area that includes the visual blind spot;

an engine control unit on the vehicle for processing the image information from the camera for detecting and calculating location of an object within the view angle area of the camera, and for calculating lateral distance between the vehicle and the object and comparing the lateral distance to a predetermined distance;

an alarm on the vehicle controlled by the engine control unit, wherein when the engine control unit activates the alarm when the lateral distance between the vehicle and the object is less than the predetermined distance; and a steering wheel position sensor disposed on the vehicle, wherein the steering wheel position sensor senses an amount of rotation of the steering wheel with respect to a neutral position corresponding to a generally straight trajectory of the vehicle.

11. The vehicle of claim 10 further comprising:

a display disposed on the vehicle, wherein the engine control unit displays the image information from the camera on the display.

12. The vehicle of claim 10 wherein the camera images both infrared light and visible light.

* * * * *